(12) United States Patent
Dent

(10) Patent No.: US 8,037,651 B2
(45) Date of Patent: Oct. 18, 2011

(54) GROUND ANCHOR ASSEMBLY

(76) Inventor: Clifford Dent, Farmington, NM (US)

( * ) Notice: Subject to any disclaimer, the term of this patent is extended or adjusted under 35 U.S.C. 154(b) by 280 days.

(21) Appl. No.: 12/402,787

(22) Filed: Mar. 12, 2009

(65) Prior Publication Data

US 2009/0272053 A1 Nov. 5, 2009

Related U.S. Application Data

(60) Provisional application No. 61/037,850, filed on Mar. 19, 2008.

(51) Int. Cl.
*E04C 5/80* (2006.01)
*E04C 5/74* (2006.01)

(52) U.S. Cl. .............. 52/296; 52/295; 52/297; 52/98; 52/707; 403/21; 403/2; 403/13

(58) Field of Classification Search ............. 52/293.3, 52/294–297, 292, 170, 699, 707, 98; 403/2, 403/21, 293
See application file for complete search history.

(56) References Cited

U.S. PATENT DOCUMENTS

| | | | | |
|---|---|---|---|---|
| 3,630,474 A * | 12/1971 | Minor | ............................... | 52/98 |
| 3,736,554 A * | 5/1973 | Barbier | ........................... | 367/21 |
| 3,837,752 A * | 9/1974 | Shewchuk | ........................ | 403/2 |
| 3,918,229 A * | 11/1975 | Schweinberger | ............... | 52/295 |
| 3,963,210 A * | 6/1976 | Macklin | ......................... | 249/210 |
| 4,007,564 A * | 2/1977 | Chisholm | ......................... | 52/98 |
| 4,052,826 A * | 10/1977 | Chisholm | ......................... | 52/98 |
| 4,169,569 A * | 10/1979 | Riegler et al. | ................. | 248/680 |
| 4,923,319 A * | 5/1990 | Dent | ................................. | 403/2 |
| 5,505,033 A * | 4/1996 | Matsuo et al. | .................. | 52/296 |
| 5,596,845 A * | 1/1997 | Strizki | ............................. | 52/98 |
| 5,740,645 A | 4/1998 | Raby | | |
| 6,210,066 B1 | 4/2001 | Dent | | |
| 6,910,826 B1 * | 6/2005 | Damiano | .......................... | 403/2 |
| 7,195,222 B2 | 3/2007 | Dent | | |

* cited by examiner

*Primary Examiner* — Phi Dieu Tran A
(74) *Attorney, Agent, or Firm* — Seed IP Law Group PLLC

(57) ABSTRACT

A ground anchor assembly includes at least two threaded studs, an anchor plate having at least two openings sized and shaped to receive the at least two threaded studs. The assembly further includes a first fastener for each of the at least two threaded studs attached to the respective stud and bearing against a first side of the anchor plate, and a break-away fastener for each of the at least two threaded studs and attached to the respective stud on an opposite side of the anchor plate. Each break-away fastener cooperates with the corresponding first fastener to retain the corresponding stud in position relative to the anchor plate and the other of the at least two studs.

11 Claims, 4 Drawing Sheets

GROUND ANCHOR ASSEMBLY

BACKGROUND

1. Technical Field

The present disclosure is directed to ground anchor assemblies and, in one embodiment, to an embedded assembly of anchor bolts and anchor plate for attaching signposts, luminaries, and the like to a concrete foundation.

2. Description of the Related Art

Highway signs, luminaries, fences, and guardrails are typically supported on posts that are attached to concrete foundations. The support posts typically have a base that is attached to bolts that are embedded in and extend from the concrete foundation. While the base may be separate from or integrally formed with the post, it is important that the base be plum with the concrete foundation so that the post is supported in a substantially vertical orientation.

Anchor bolts extending from the concrete foundation can be in the shape of a J-shaped bolt in which the curved portion is embedded in the concrete and the exposed straight portion is threaded to receive a fastener, such as a nut. It is critical that these anchor bolts be properly positioned and aligned with respect to one another and to the concrete foundation so that the support post base will properly fit over the anchor bolts and be plum on the foundation.

A difficulty in embedding the anchor bolts during formation of the concrete foundation is maintaining the proper orientation and alignment of the anchor bolts as concrete is poured around them and into the foundation hole or foundation form. When the concrete is poured and then tamped or vibrated into place, these anchor bolts frequently move in the liquid concrete. When concrete sets, the flanged base will have difficulty slipping over the misaligned anchor bolts and may be out of plum. This can make the installation process extremely difficult for installation crews and in some cases require the foundation to be replaced. In other cases, the bolt holes in the base flange will need to be enlarged to accommodate the out-of-alignment studs protruding from the foundation. This usually requires shimming to get the post into a plum position.

One proposed solution is a J-bolt form disclosed in U.S. Pat. No. 5,740,645 in which a bolt alignment and support device is attached to the top of a concrete form, and the anchor bolts are attached thereto to extend down into the form. Holes formed in the support device allow concrete to be poured therethrough, after which the support device is uncoupled from the fasteners and removed from the form.

While the foregoing design may be satisfactory in some conditions, it requires extra labor to remove the support device. In addition, concrete must be quickly and thoroughly cleaned from the support device so that it can be reused. Moreover, this device can only be used where forms of a certain size and shape allow the support device to be placed thereon. For these and other reasons, the proposed J-bolt form is unsuitable. Hence, there is a need for a template that maintains the anchor bolts in the proper position and alignment and does not require later removal and cleaning.

BRIEF SUMMARY

The present disclosure is directed to a ground anchor assembly used in conjunction with a support post. In accordance with one embodiment, an assembly is provided that includes at least two threaded studs, an anchor plate having at least two openings sized and shaped to receive the at least two threaded studs, a first fastener for each of the at least two threaded studs attached to a respective stud and bearing against a first side of the anchor plate, and a break-away fastener for each of the at least two threaded studs and attached to the respective stud on an opposite side of the anchor plate and cooperating with the first fastener to retain the stud in position relative to the anchor plate and the other studs.

In accordance with another aspect of the foregoing embodiment, the assembly includes a threaded sleeve attached to each stud on the second side of the anchor plate and further attached to the break-away fastener to couple the break-away fastener to the respective stud on the second side of the anchor plate.

In accordance with another aspect of the foregoing embodiment, the break-away fastener includes a first end adapted to be attached to the stud, a second opposing end, and a break-away shank positioned between and connected to the first and second ends, the break-away shank having a single preformed stress point such that when the break-away shank is subjected to a predetermined lateral load, the break-away shank will break only at the single preformed stress point, the break-away shank further including a circumscribing flange formed thereon at the intersection of the first end and the break-away shank and at the intersection of the second end and the break-away shank.

In accordance with another embodiment of the present disclosure, a post support assembly is provided that includes a concrete foundation and an assembly embedded in the concrete foundation, the assembly having at least two threaded studs, an anchor plate having at least two openings sized and shaped to receive the at least two threaded studs, a first fastener for each of the at least two threaded studs attached to the respective stud and bearing against a first side of the anchor plate, and a break-away fastener for each of the at least two threaded studs and attached to the respective stud on an opposite side of the anchor plate and cooperating with the first fastener to retain the stud in position on and relative to the anchor plate, the assembly positioned in the concrete foundation so that only a portion of the break-away fastener extends from a top of the concrete foundation.

In accordance with another aspect of the foregoing embodiment, the break-away fastener includes a first end adapted to be attached to the stud and a second end, and further includes a break-away shank positioned between the first and second ends, the break-away shank having a first circumscribing flange formed at the intersection of the first end and the break-away shank and a second flange formed at the intersection of the second end and the break-away shank, the first flange bearing against an exposed top surface of the concrete foundation.

In accordance with another aspect of the foregoing embodiment, the assembly further includes a threaded sleeve having a first end attached to the stud and a second end attached to the break-away fastener.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings, wherein.

DETAILED DESCRIPTION

Figure 1:
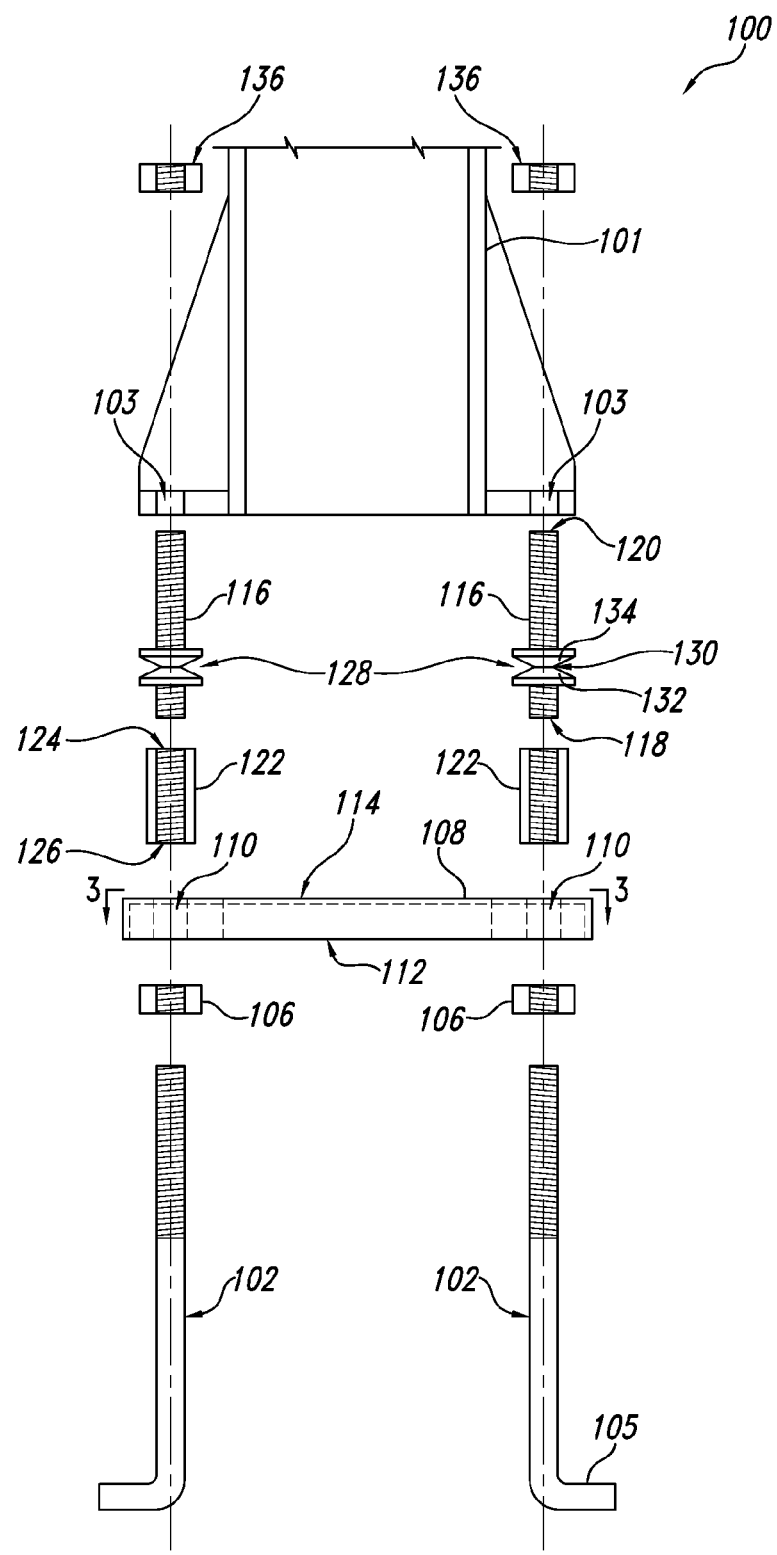
FIG. 1 is an exploded side view of an assembly formed in accordance with the present disclosure.

FIG. 1 illustrates an anchor assembly 100 according to one embodiment to be used for anchoring objects to the ground or other supporting surface or structure. The anchor assembly 100 can be used in applications such as anchoring an article 101 for display or other suitable purpose. The article 101 can include highway signs, luminaries, fences, and guardrails, or any other article desired to be supported. The ground anchor assembly 100 includes at least two threaded studs 102 that in application are secured in a foundation 104 (FIG. 2), such as a concrete or soil foundation.

The threaded studs 102 can be made of any suitable material that can withstand typical loads imposed thereon by the foundation 104, for example during pouring or hardening of concrete around embedded portions of the anchor assembly 100 in applications where the foundation 104 includes a concrete foundation. The threaded studs 102 can for example be fabricated from a variety of metals, such as steel, aluminum, titanium, or other metals, composites, plastics, especially hard plastics, or any combination thereof.

Furthermore, the threaded studs 102 can include any cross-sectional shape or structure, such as circular, rectangular, elliptical, hollow, or solid, or any combination thereof. The threaded studs 102 can also have any suitable longitudinal shape or structure. In the embodiment illustrated in FIGS. 1 and 2, the threaded studs 102 include a return flange 105 for improved retention in the foundation 104. One of ordinary skill in the art will appreciate that the threaded studs 102 can include a curved longitudinal shape or multiple generally laterally extending flanges extending from a longitudinal portion thereof. In one embodiment, the threaded studs 102 are L-shaped or J-shaped.

The ground anchor assembly 100 further includes at least one securing fastener 106 to be threadably received on each threaded stud 102. In addition, in a preferred embodiment the ground anchor assembly 100 includes an anchor plate 108 that has at least two openings 110 sized and shaped to receive the two threaded studs 102, respectively. Ideally the studs 102 are slidably received through the openings 110, although in another embodiment they can be threadably received when the openings 110 have internal threads.

The anchor plate 108 can be made of any material that can withstand loads associated with potential movements in the foundation 104 and withstand corrosive deterioration from the concrete or surrounding material. For example, the anchor plate 108 can be fabricated from a variety of metals, such as steel, aluminum, titanium, or other metals, composites, plastics, especially hard plastics, or any combination thereof. In the illustrated embodiment of FIG. 1, the ground anchor assembly 100 includes four securing fasteners 106 respectively attached or coupled to four threaded studs 102. The securing fasteners can include threaded nuts, biased vice-like fasteners, or any other fasteners that can suitably secure the threaded studs 102, allowing a portion of the studs 102 to pass beyond the securing fasteners 106.

FIG. 1 is a side view illustrating only two of the threaded studs 102. However, viewing the anchor plate 108 in the top view illustrated in FIG. 3, it can be seen that it includes four openings 110 configured to receive four threaded studs 102. In other embodiments, which include a different number of studs 102, the anchor plate 108 includes at least a corresponding number of openings 110 for the threaded studs 102 to pass therethrough, respectively.

Figure 2:
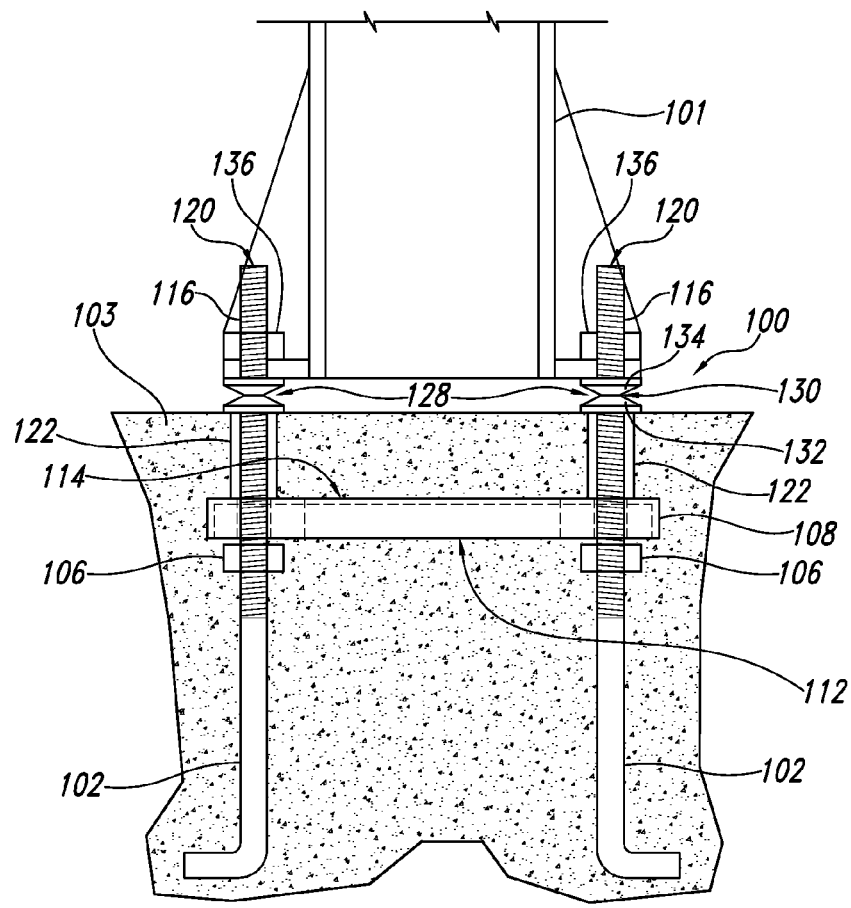
FIG. 2 is a partial cross-sectional side view of the installed assembly of FIG. 1.
Figure 3:
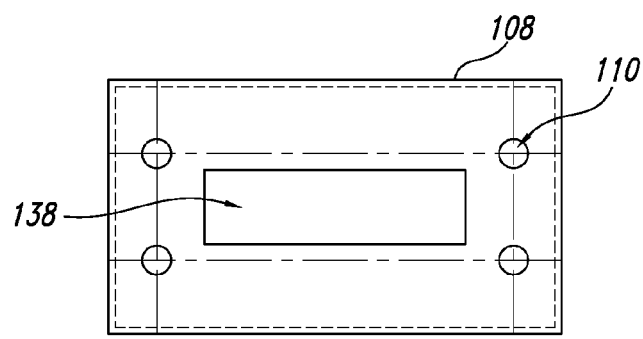
FIG. 3 is a top plan form view of an anchor plate formed in accordance with one embodiment of the present disclosure and used in the assembly of FIG. 1.

The anchor plate 108 of the illustrated embodiment of FIGS. 1 through 3 includes a rectangular shape having a first side 112 and a second side 114, opposed to the first side 112. The securing fasteners 106, which respectively attach to the threaded studs 102, bear along a portion or surface thereof against the first side 112 of the anchor plate 108. On the second side 114 of the anchor plate 108, the ground anchor assembly 100 includes a sleeve 122 and a break-away fastener 116 for each of the threaded studs 102. In the illustrated embodiment of FIG. 1, the ground anchor assembly 100 includes four break-away fasteners 116 for attaching to the four threaded studs 102, respectively, on the second side 114 of the anchor plate 108 via the sleeves 122.

FIG. 2 illustrates the ground anchor assembly 100 in the installed state. As illustrated in FIG. 3, each of the sleeves 122 cooperate with the corresponding securing fastener 106 to retain the corresponding threaded stud 102 in position relative to the anchor plate 108 and the other threaded studs 102. Accordingly, the anchor plate 108 in cooperation with the securing fasteners 106 and sleeves 122 prevents or minimizes unwanted movement of the threaded studs 102, for example at a time period during which the foundation 104 is being poured or hardened where the foundation 104 includes a concrete foundation.

Furthermore, where the ground anchor assembly 100 is grounded in a foundation 104 that includes soil particles, such particles can be subject to movement. In these circumstances, the anchor plate 108 in cooperation with the securing fasteners 106 and sleeves 122 prevents or minimizes relative movement between the threaded studs 102. Such movement can result in weakening of the anchoring structure, and therefore the anchor plate 108 maintains the strength of the ground anchor assembly 100 in supporting the article 101 by preventing or minimizing such movement.

The threaded studs 102 can attach to the break-away fasteners 116 in any suitable manner. In the description that follows, one example of such an attachment is provided with respect to one of the studs 102 and the corresponding break-away fastener 116 for clarity of description. However, it can be applied to all or some of the studs 102, although it is preferred that it is applied to all of the studs 102.

In one aspect, as illustrated in FIG. 1, the break-away fastener 116 includes a first end 118 and a second end 120. Furthermore, the break-away fastener 116 has external threads on the first and second ends 118, 120. The ground anchor assembly 100 also includes the sleeve 122 having a longitudinal axial bore in a first end 124 and in a second end 126. The sleeve 122 threadedly receives the first end 118 of the break-away fastener 116 in the first end 124 of the sleeve 122 and receives a portion of the threaded studs 102 in the second end 126 of the sleeve 122. The portion of the threaded studs 102 threadedly received by the sleeve 122 is positioned on the second side 114 of the anchor plate 108, and the sleeve 122 bears against the second side 114 of the anchor plate 108.

Accordingly, as illustrated in FIG. 2, upon assembly, the threaded anchor studs 102 are secured with respect to the anchor plate 108 by the securing fastener 106 on the first side 112 of the anchor plate 108 and by the sleeve 122 on the second side of the anchor plate 108, while the threaded anchor studs 102 extend through the openings 110 of the anchor plate 108 to respectively couple to the break-away fasteners 116 via the sleeve 122.

The break-away fasteners 116 extend beyond the foundation 104 exposing a portion of the break-away fasteners 116 at their second end 120 for attachment to the article 101. Furthermore, the break-away fasteners 116 each include a break-away shank 128, which has a single preformed stress point 130 such that when the break-away shank 128 or other portion of the break-away fasteners 116 is subjected to a load equal to or greater than a threshold load, for example, a predetermined lateral load, the break-away shank 128 will break only at the single preformed stress point 130. The break-away shank 128 further includes a first circumscribing flange 132 formed at the intersection of the first end 118 (FIG. 1) and the break-away shank 130, and a second circumscribing flange 134 formed at the intersection of the second end 120 and the break-away shank 130. The first circumscribing flange 132 includes a portion that bears against a top surface of the foundation 104. The break-away fastener 116 is described in more detail in U.S. Pat. No. 4,923,319, which is incorporated herein by reference in its entirety.

In this embodiment, the second ends 120 of the break-away fasteners 116 extend and threadedly couple to the article 101, for example in a threaded opening 103 (FIG. 1) in the article 101 or in a fixture or base associated with the article 101. The ground anchor assembly 100 can include an optional leveling fastener 136 for each break-away fastener 116, which receives the break-away fastener 116 toward the second end 120. The second end 120 of the break-away fastener 116 protrudes through the threaded opening 103 associated with the article 101. In one aspect, the leveling fastener 136 includes a threaded nut and the first and second ends 118, 120 of the break-away fasteners 116 includes threaded shafts, the nut being adjustably and threadedly coupled to the break-away fastener 116 threaded shaft toward the second end 120. In this manner, the multiple leveling fasteners 136 can be threadedly adjusted to level the article 101 or orient it in a desired position.

As illustrated in FIG. 3, in one aspect, the anchor plate 108 includes an intermediate opening 138 formed between the openings 110 through which the threaded studs 102 pass. The intermediate opening 138 allows the material that makes up the foundation 104 to pass therethrough, when being poured, thereby better securing the anchor plate 108, and the threaded studs 102, in the foundation 104. In addition, the intermediate opening 138 reduces a surface area of the anchor plate 108, therefore, minimizing movement of the anchor plate 108 in response to deformation or movement of the material of the foundation 104, for example during pouring or hardening of concrete, or other movements associated with a particular material from which the foundation 104 can be composed, such as soil movement.

Figure 4:
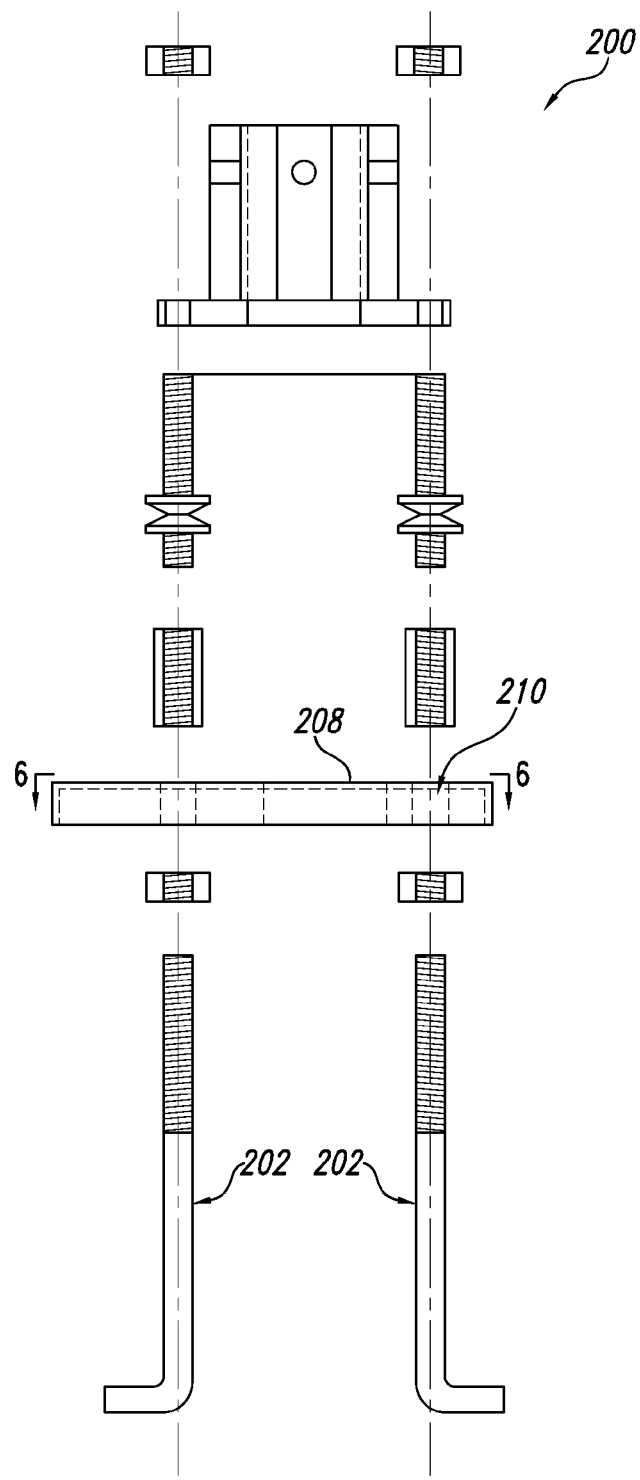
FIG. 4 is an exploded side view of a second embodiment of an assembly formed in accordance with the present disclosure.
Figure 5:
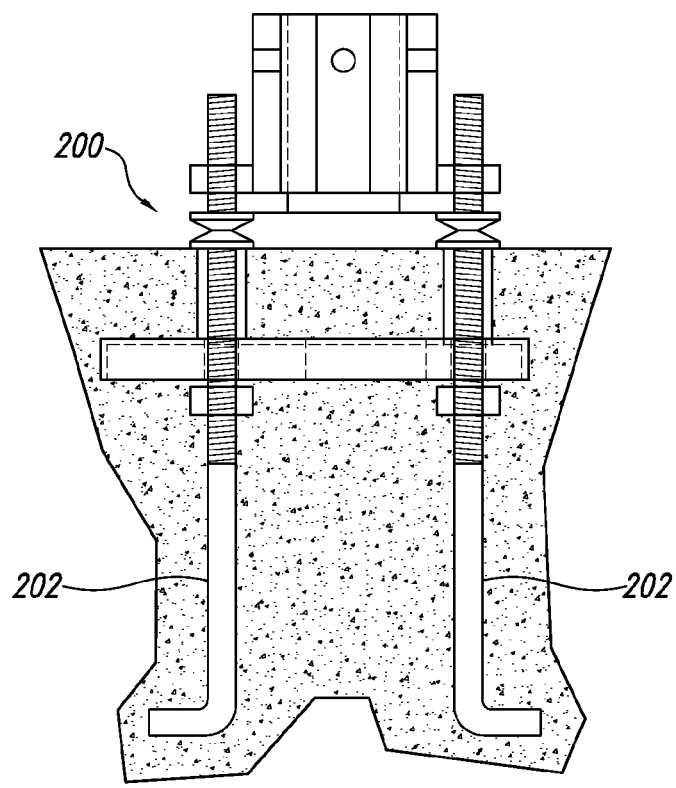
FIG. 5 is a partial cross-sectional view of an assembled support post assembly of FIG. 4.
Figure 6:
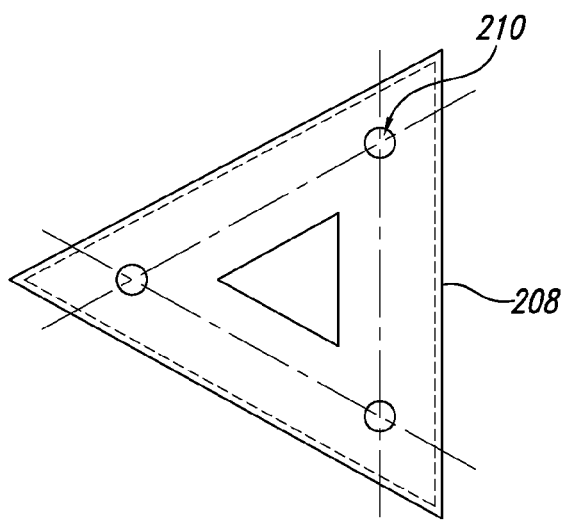
FIG. 6 is a top plan form view of a second embodiment of an anchor plate formed in accordance with the present disclosure and used in the assembly of FIG. 4.

FIGS. 4 through 6 depict another embodiment, in which a ground anchor assembly 200 includes three threaded studs 202 and a triangular shaped anchor plate 208 having three openings 210 corresponding to the threaded studs 202, respectively. Other features of this embodiment and the general assembly manner thereof are similar to the embodiment described above in conjunction with FIGS. 1 through 3.

One of ordinary skill in the art can appreciate that other embodiments can include anchor plates that have other shapes, such as square, circular, octagonal, elliptical, hexagonal, oval, pentagonal, other multi-sided shapes, or even non-symmetrical shapes where warranted. These variations are contemplated to be within the scope of the present disclosure. The shape of the article to be supported or a fixture or base thereof can be a factor in determining the number of threaded studs and the shape of the anchor plate of a ground anchor assembly. For example, where the base of the article is triangular, this may warrant using a three stud configuration anchor assembly 200 with the triangular anchor plate 208. Alternatively, where the base of the article is rectangular, this may warrant using the four stud configuration anchor assembly 100 with the rectangular anchor plate 108, and so on. Moreover, each of these plates can have additional holes to accommodate additional studs or bolts. Also, one plate can accommodate posts or I-beams or H-beams of varying sizes.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A support assembly for a post, the support assembly comprising:
   a foundation having a top surface; and
   an assembly embedded in the foundation, the assembly comprising:
      at least two threaded studs;
      an anchor plate having a substantially flat configuration with a planar upper surface and an opposing mutually parallel planar lower surface and at least two openings, each opening sized and shaped to receive one of the at least two threaded studs;
      a first fastener for each of the at least two threaded studs structured to be attached to the respective stud and to bear against the lower surface of the anchor plate;
      a threaded sleeve for each of the at least two threaded studs and structured to be attached to the respective stud and to bear against the upper surface of the anchor plate and cooperating with the first fastener to retain the stud in position relative to the anchor plate and the other of the at least two studs; and
   a break-away fastener having a first end structured to be threadably received in the sleeve and a second end structured to be attached to the article, the break-away fastener having a first circumscribing flange structured to bear against the top surface of the footing when the anchor plate is buried in the footing.

2. The support assembly of claim 1, wherein the break-away fastener includes a break-away shank positioned between the first and second ends, the break-away shank further including the first circumscribing flange formed at the intersection of the first end and the break-away shank and a second flange formed at the intersection of the second end and the break-away shank, the first flange bearing against an exposed top surface of the concrete foundation.

3. The support assembly of claim 1, wherein the threaded sleeve is structured to extend to at least a top of the footing when the anchor plate is buried in the footing.

4. The support assembly of claim 1, wherein the at least two threaded studs comprise J-bolts.

5. The support assembly of claim 1, wherein the anchor plate has a plan form geometric configuration of one from among a square, rectangle, circle, triangle, pentagon, hexagon, octagon, and oval.

6. A system, comprising:
a foundation having a top surface;
an article to be supported on the foundation above the top surface; and
an assembly embedded in the foundation and coupled to the article to support the article above the top surface of the foundation, the assembly comprising:
at least two threaded studs, each of the at least two threaded studs having a first end that is threaded;
an anchor plate buried in the foundation, the anchor plate having a substantially flat configuration with a planar upper surface and an opposing parallel planar lower surface and a plurality of openings formed therein sized and shaped to receive the first end of the at least two threaded studs;
a first fastener for each of the at least two threaded studs, the first fastener structured to be threadably received on the first end of the respective stud and to bear against the lower surface of the anchor plate;
a threaded sleeve structured to be threadably received on the first end of the at least two threaded studs when the first end of the at least two threaded studs has been placed through a respective opening in the anchor plate and bear against the upper surface of the anchor plate and to cooperate with the first fastener to retain the respective stud in fixed position relative to the anchor plate and relative to the other of the at least two studs; and
a break-away fastener having a first end structured to be threadably received in the sleeve and a second end structured to be threadably received within a respective threaded opening in the article, the break-away fastener having a first circumscribing flange structured to bear against the top surface of the foundation.

7. The system of claim 6, wherein the break-away fastener includes a break-away shank positioned between and connected to the first and second ends, the break-away shank having a single preformed stress point such that when the break-away shank is subjected to a predetermined lateral load, the break-away shank will break only at the single preformed stress point, the break-away shank further including the first circumscribing flange formed thereon at the intersection of the first end and the break-away shank and a second circumscribing flange at the intersection of the second end and the break-away shank.

8. The system of claim 7, wherein the threaded sleeve is structured to extend above the anchor plate and to be positioned in the footing such that the sleeve terminates at least at the top surface of the footing.

9. The system of claim 8, wherein the anchor plate includes an intermediate opening structured to allow footing material to pass therethrough when the anchor plate is embedded in the foundation.

10. The system of claim 9, wherein the at least two threaded studs comprise J-bolts.

11. The system of claim 6, comprising a leveling fastener attached to each of the at least two studs at the first end to facilitate horizontal leveling of the article.

\* \* \* \* \*